US010865926B2

United States Patent
Uenishi et al.

(10) Patent No.: US 10,865,926 B2
(45) Date of Patent: Dec. 15, 2020

(54) JOINT DEVICE

(71) Applicant: U-TEC Co., Ltd., Osaka (JP)

(72) Inventors: Yukio Uenishi, Osaka (JP); Yuji Kondo, Osaka (JP)

(73) Assignee: U-TEC Co., Ltd., Osaka (JP)

( * ) Notice: Subject to any disclaimer, the term of this patent is extended or adjusted under 35 U.S.C. 154(b) by 163 days.

(21) Appl. No.: 15/532,301

(22) PCT Filed: Dec. 1, 2015

(86) PCT No.: PCT/JP2015/083785
§ 371 (c)(1),
(2) Date: Jun. 1, 2017

(87) PCT Pub. No.: WO2016/088764
PCT Pub. Date: Jun. 9, 2016

(65) Prior Publication Data
US 2018/0266607 A1    Sep. 20, 2018

(30) Foreign Application Priority Data

Dec. 5, 2014    (JP) ................. 2014-247144

(51) Int. Cl.
*F16L 37/32*    (2006.01)
*F15B 20/00*    (2006.01)
(Continued)

(52) U.S. Cl.
CPC .............. *F16L 37/32* (2013.01); *F15B 20/00* (2013.01); *F15B 20/002* (2013.01);
(Continued)

(58) Field of Classification Search
CPC ......... F16L 37/32; F16L 37/30; F16L 29/002; F16L 37/23; F16L 55/07; F15B 20/00;
(Continued)

(56) References Cited

U.S. PATENT DOCUMENTS 2,741,477 A * 4/1956 Mercier .................. F15B 20/00
49/14
3,028,877 A * 4/1962 Thieme .................. F15B 13/00
137/509
(Continued)

FOREIGN PATENT DOCUMENTS

JP    H01-28273 B2    6/1989
JP    2009-127797 A    6/2009
(Continued)

OTHER PUBLICATIONS

Definition of the term "stop valve" by Google, see p. 1 (Year: 2019).*
(Continued)

*Primary Examiner* — David Colon-Morales
(74) *Attorney, Agent, or Firm* — Osha Liang LLP (57) ABSTRACT

Provided is a joint device which can be connected by quick and simple operation while being subjected to high-pressure high-flow-rate pressurized operating oil.
The present invention comprises: a closed chamber 27 provided in a hydraulic circuit on which pressurized fluid acts, the pressurized fluid circuit having an upstream side and a downstream side, which are closed by an upstream-side stop valve 211 and a downstream-side stop valve 212; a male joint 30 provided at a position in communication with the closed chamber 27; and a female joint 40 connectable to the male joint 30 and provided in an emergency hydraulic circuit connected to the hydraulic circuit. The present invention is configured so that the female joint 40 is connected to the male joint 30 while the closed chamber 27 is closed by the upstream-side stop valve 211 and the downstream-side stop valve 212.

3 Claims, 8 Drawing Sheets

(51) Int. Cl.
*F16L 29/00* (2006.01)
*F16L 37/23* (2006.01)
*F16L 37/30* (2006.01)
*F16L 55/07* (2006.01)

(52) U.S. Cl.
CPC .......... *F15B 20/004* (2013.01); *F16L 29/002* (2013.01); *F16L 37/23* (2013.01); *F16L 37/30* (2013.01); *F16L 55/07* (2013.01); *F15B 2211/8623* (2013.01); *F15B 2211/8633* (2013.01); *Y10T 137/87917* (2015.04)

(58) Field of Classification Search
CPC .................. F15B 20/002; F15B 20/004; F15B 2211/8623; F15B 2211/8633; F15B 2211/8757; F15B 2211/8752; Y10T 137/87917; Y10T 137/87925; Y10T 137/87933; Y10T 137/87941; Y10T 137/87949; Y10T 137/87957; Y10T 137/87965; Y10T 137/87973; Y10T 137/88022; Y10T 137/8803; Y10T 137/88038
See application file for complete search history.

(56) References Cited

U.S. PATENT DOCUMENTS

| | | | | |
|---|---|---|---|---|
| 3,513,751 A * | 5/1970 | Escobosa | ................ | B64C 13/42 137/113 |
| 3,613,818 A * | 10/1971 | Schubert | ................ | B60J 7/1273 180/406 |
| 3,625,240 A * | 12/1971 | MacDuff | ................ | B60T 13/168 137/113 |
| 3,791,775 A * | 2/1974 | Bochnak | ................ | F15B 11/17 417/426 |
| 3,933,176 A * | 1/1976 | Wheeler | ................ | F15B 18/00 137/596 |
| 3,952,510 A * | 4/1976 | Peterson | ............... | E02F 9/2221 60/403 |
| 4,116,577 A * | 9/1978 | Lauck | ...................... | B62D 5/07 417/286 |
| 4,147,179 A * | 4/1979 | Miura | ..................... | F15B 13/02 137/599.09 |
| 4,256,017 A * | 3/1981 | Eastman | ............... | F15B 11/128 137/596.17 |
| 4,703,774 A * | 11/1987 | Seehausen | .......... | E21B 33/0355 137/614 |
| 5,058,383 A * | 10/1991 | Tsunemi | ................. | F16H 61/40 60/465 |
| 5,335,926 A * | 8/1994 | Stolle | ..................... | B60J 7/1273 296/117 |
| 5,365,972 A * | 11/1994 | Smith, III | ................ | F16L 1/26 137/614.04 |
| 5,469,703 A * | 11/1995 | Ericsson | ............... | F15B 11/055 60/399 |
| 6,009,902 A * | 1/2000 | Troiani | ................... | F16L 37/28 137/614.11 |
| 7,107,781 B2 * | 9/2006 | Quest | ................. | B60H 1/00585 62/292 |
| 7,600,715 B2 * | 10/2009 | Matsui | .................... | B64C 13/42 244/227 |
| 7,726,107 B2 * | 6/2010 | Dueckinghaus | ....... | A01D 69/03 56/11.9 |
| 8,567,436 B2 * | 10/2013 | Polgati | .................... | F15B 20/00 137/595 |
| 8,616,858 B2 * | 12/2013 | Rosner | .................... | F15B 11/17 137/115.03 |
| 8,936,118 B2 * | 1/2015 | Gebele | .................... | F15B 1/022 137/899.4 |
| 8,973,896 B2 * | 3/2015 | Tiberghien | .............. | F16K 17/00 137/614.03 |
| 9,416,798 B2 * | 8/2016 | Uenishi | .................... | F15B 11/08 |
| 9,429,231 B2 * | 8/2016 | Uenishi | .................. | F15B 21/005 |
| 2009/0100830 A1 * | 4/2009 | Schneider | ............... | F15B 1/024 60/413 |
| 2013/0312401 A1 * | 11/2013 | Frommelt | ............... | F15B 15/00 60/459 |
| 2014/0230425 A1 * | 8/2014 | Uenishi | ............... | F15B 11/0426 60/494 |

FOREIGN PATENT DOCUMENTS

| | | |
|---|---|---|
| JP | 2011-231924 A | 11/2011 |
| JP | 2012-137184 A | 7/2012 |
| JP | 2014-040909 A | 3/2014 |
| JP | 2014-173721 A | 9/2014 |

OTHER PUBLICATIONS

International Search Report issued in corresponding application No. PCT/JP2015/083785 dated Feb. 23, 2016 (4 pages).

Written Opinion of the International Searching Authority issued in corresponding application No. PCT/JP2015/083785 dated Feb. 23, 2016 (5 pages).

Extended Search Report issued in European Application No. 15865405.3, dated Aug. 30, 2018 (8 pages).

* cited by examiner

PRIOR ART

FIG.5A

PRIOR ART

FIG.5B

JOINT DEVICE

TECHNICAL FIELD

The present invention relates to a joint device configured to joint another hydraulic pressure source to a hydraulic circuit subjected to high-pressure high-flow-rate operating oil.

BACKGROUND ART

A hydraulic circuit subjected to high-pressure high-flow-rate operating oil (hereinafter, high pressure state) means the hydraulic circuit is connected to a pressure fluid source, and the high-pressure high-flow-rate operating oil is acting on this hydraulic circuit.

This state of the hydraulic circuit subjected to high-pressure high-flow-rate operating oil encompasses not only cases where an operating machine is properly operating, but also a case of elevating a water gate (gate) of a dam by a hydraulic cylinder of a gate elevation device, in which case a pressure is maintained at one end of the hydraulic cylinder, as is disclosed in PTL 1. In this state, a rod-side pressure chamber of the hydraulic cylinder that elevates the water gate is subjected to a hydraulic pressure equivalent to the weight of the water gate. In other words, the rod-side pressure chamber of the hydraulic cylinder is always subjected to a load and is in the high pressure states, and is subjected to high flow rate operating oil. It should be noted that the hydraulic circuit to be connected to the rod-side pressure chamber is in the high pressure state.

When the pressure fluid source of the hydraulic circuit of the gate elevation device stops due to earthquake or power outage, one end of the circuit (the hydraulic circuit connecting the rod-side pressure chamber of the hydraulic cylinder) is subjected to a hydraulic pressure by the weight of the gate (high pressure state). To prevent a secondary disaster stemming from stoppage of the gate, there is a need for connecting an emergency hydraulic pressure source device (hereinafter, also referred to as sub hydraulic pressure unit) to the hydraulic circuit in the high pressure state.

Figure 4:
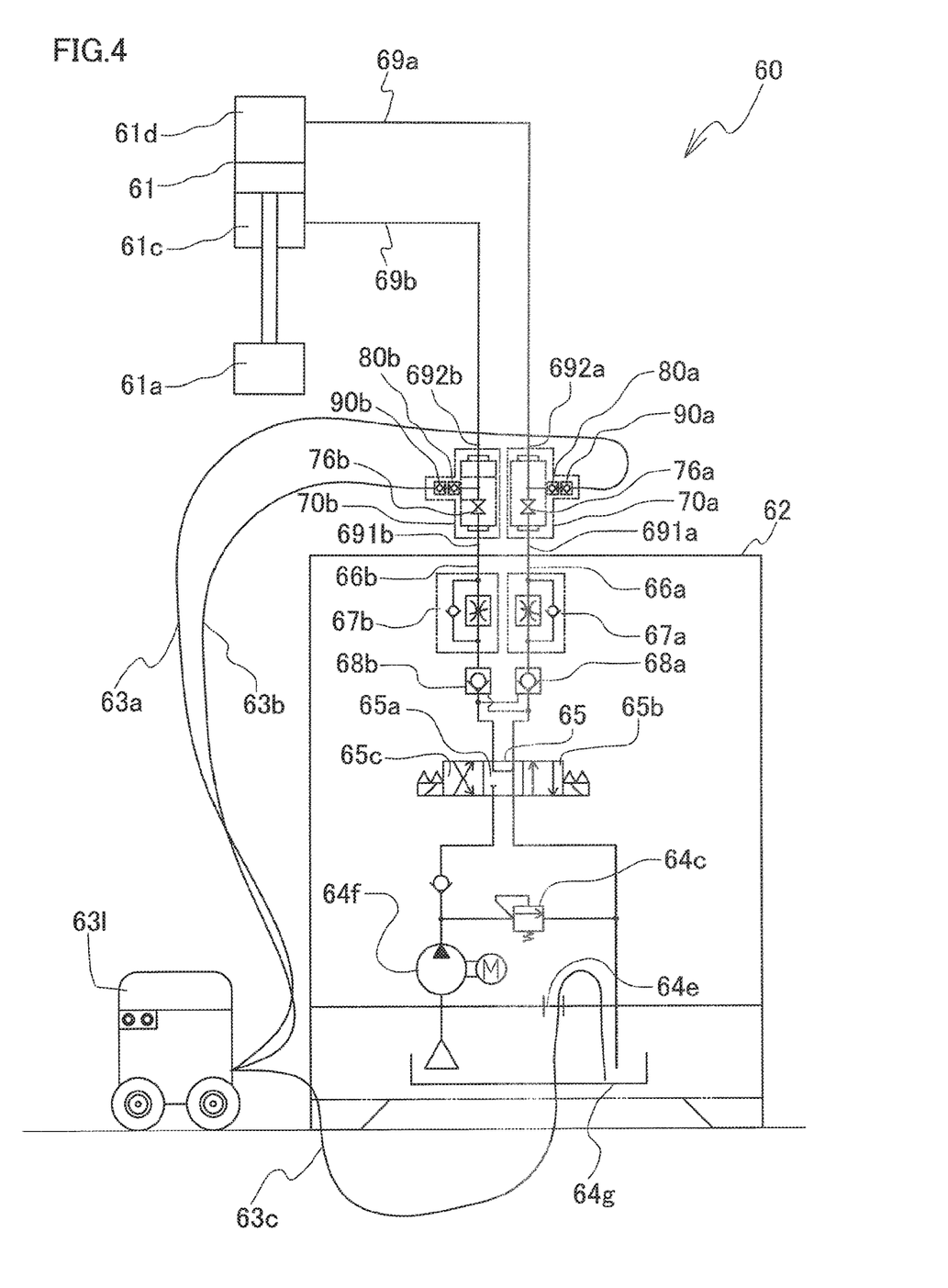
FIG. 4 is a hydraulic circuit diagram showing a joint device of a traditional art.
Figure 5A:
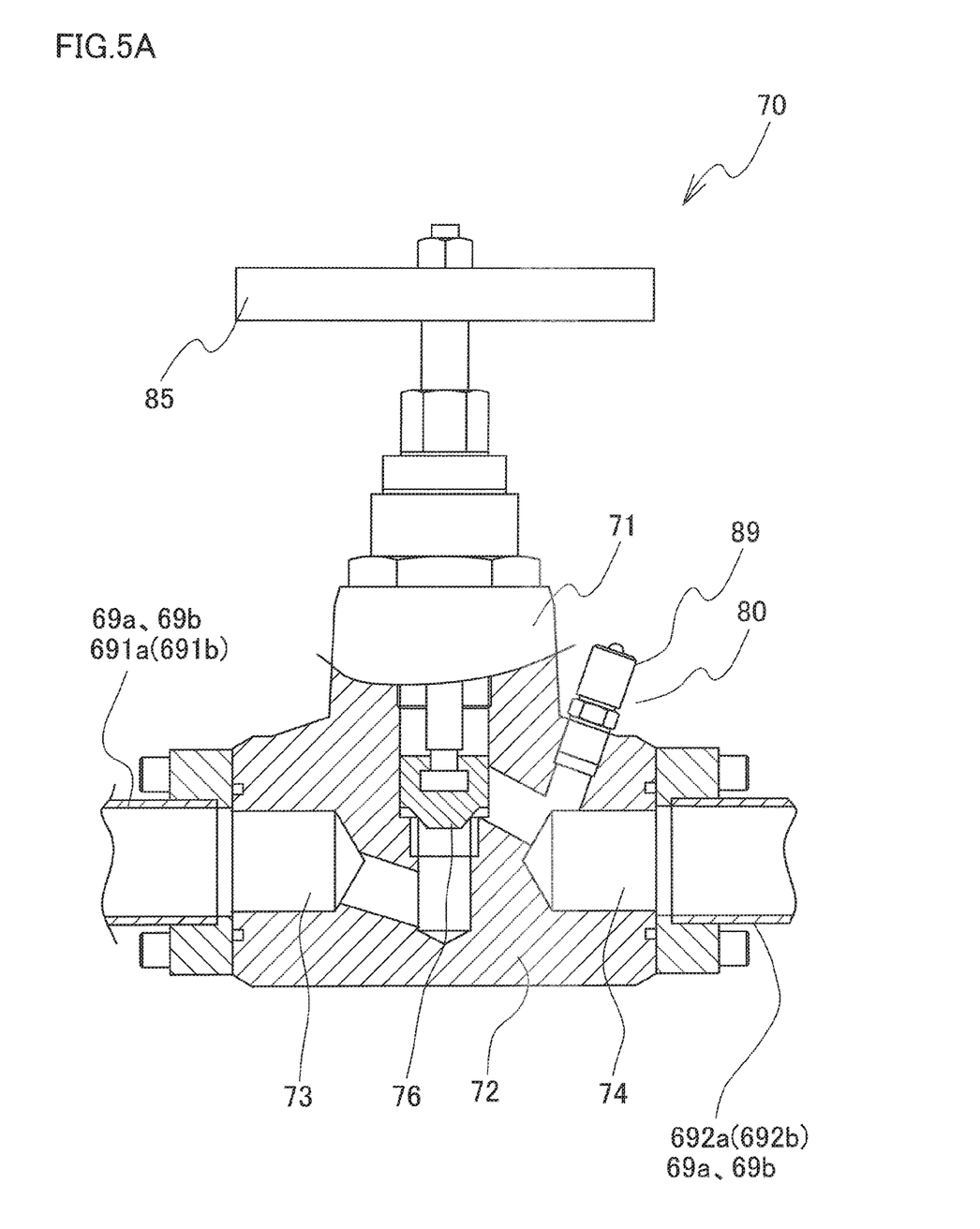
FIG. 5A is a cross sectional view of the joint device of the traditional art.
Figure 5B:
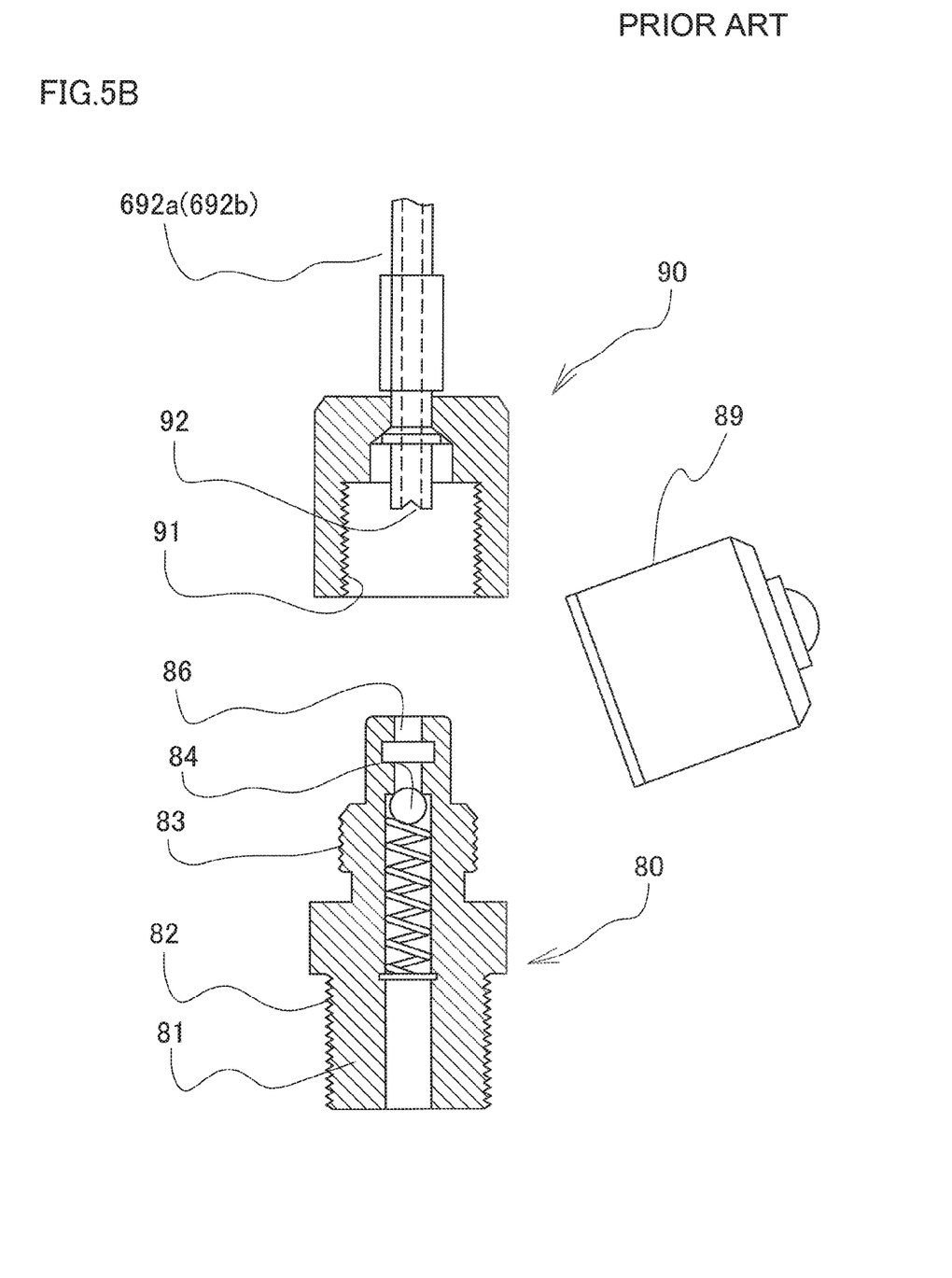
FIG. 5B is a cross sectional view of a male joint and a female joint of the joint device of the traditional art.

The following describes the traditional art with reference to FIG. 4 showing a hydraulic circuit of PTL 1, and FIG. 5A and FIG. 5B showing a joint device used for this hydraulic circuit. It should be noted that in the traditional art as well as in the embodiment of the present invention, a pair of machines with identical structures are used. Therefore, the pair of machines are given alphabets "a" and "b" to their reference symbols to distinguish one from the other. Further, when the alphabets "a" and "b" are not given to the reference symbols, the description applies to both of the pair of machines. Further, an upstream side means a pump side, and the downstream side means a hydraulic cylinder side.

As shown in FIG. 4, a hydraulic circuit 60 used in an elevation device for a weir or a gate of a dam includes: a hydraulic cylinder 61 which elevates a load 61a such as a weir or a gate of a dam; and a hydraulic pressure unit 62 configured to generate pressurized operating oil to be supplied to the hydraulic cylinder 61, and to supply and discharge the pressurized operating oil to/from the hydraulic cylinder 61.

This hydraulic circuit 60 elevates the load 61a by having the hydraulic pressure unit 62 supply or discharge operating oil to/from the hydraulic cylinder 61. This function of the hydraulic pressure unit 62 however is lost in an event of earthquake or power outage due to insufficient power. To tackle such an incidence, the hydraulic circuit 60 is provided with a sub hydraulic pressure unit 631 whose main driving force is an internal combustion engine.

Although the main driving force of the sub hydraulic pressure unit 631 is an internal combustion engine, there are various driving force such as a battery, use of a dynamo of an automobile, and a manual operation. The sub hydraulic pressure unit 631 is an example device that substitutes for the hydraulic pressure unit 62.

When the hydraulic pressure unit 62 is not able to function as a hydraulic pressure generation source due to power outage, break down of the hydraulic pump, or other components of the hydraulic pressure unit 62 such as a direction switching valve, speed adjustment valve, and the like, the sub hydraulic pressure unit 631 controls the feed and discharge of the pressurized operating oil for proper operation of the hydraulic cylinder 61, in place of the hydraulic pressure unit 62.

In a normal occasion, the sub hydraulic pressure unit 631 is separated from the hydraulic pressure unit 62, and the hydraulic cylinder 61 operates only with the pressurized operating oil from the hydraulic pressure unit 62. More specifically, the sub hydraulic pressure unit 631 is separated from the hydraulic pressure unit 62 by separating female joints 90a and 90b of flexible feed/discharge conduits 63a and 63b from male joints 80a and 80b, respectively, and pulling out a flexible tank conduit 63c from an oil supply port 64e of a tank 64g, thus separating it from the tank 64g.

When the hydraulic pump 64f is driven by an electric motor and pressurized operating oil is generated, the hydraulic pressure unit 62 controls the pressurized operating oil to a constant value with a pressure control valve 64c. The pressurized operating oil is further controlled by an electromagnetic direction switching valve 65, and is fed or discharged to/from the hydraulic cylinder 61 via a feed/discharge circuits 66a and 66b and feed/discharge ducts 69a and 69b.

The electromagnetic direction switching valve 65 is in a neutral position 65a in FIG. 4. In this state of FIG. 4, the ejection side of the hydraulic pressure unit 62 is closed, and the pressurized operating oil ejected from the pressurized operating oil pump 64f is maintained at a constant value by the pressure control valve 64c. Since the feed/discharge circuits 66a and 66b connect to the tank 64g, load check valves 68a and 68b are shut.

As described, while the electromagnetic direction switching valve 65 is in the neutral position 65a as shown in FIG. 4, the feed/discharge circuits 66a and 66b are shut by the load check valves 68a and 68b. The operating oil in the rod-side pressure chamber 61c of the hydraulic cylinder 61 is maintained by the load check valves 68a, and the load 61a maintains its position.

When the electromagnetic direction switching valve 65 is operated to the right changeover position 65b, the ejected pressure oil from the hydraulic pump 64f flows into the rod-side pressure chamber 61c of the hydraulic cylinder 61 from the feed/discharge circuit 66b of the hydraulic pressure unit 62, via the feed/discharge duct 69b connected thereto and a joint device 70b provided in a position of the feed/discharge duct 69b close to the feed/discharge circuit 66b. This causes the operating oil of the cap side pressure chamber 61d to flow out into the tank 64g, thus ascending the load 61a at a speed controlled by the speed control valve 67a.

When the electromagnetic direction switching valve 65 is operated to the left changeover position 65c, the ejected pressure oil from the hydraulic pump 64f flows into the cap side pressure chamber 61d of the hydraulic cylinder 61, from the feed/discharge circuit 66a of the hydraulic pressure unit 62, via the feed/discharge duct 69a connected thereto and a joint device 70a provided in a position of the feed/discharge duct 69a close to the feed/discharge circuit 66a, and the operating oil of the rod-side pressure chamber 61c flows out to the tank 64g. Therefore, the load 61a descends at a speed controlled by the speed control valve 67b.

As hereinabove-mentioned, the hydraulic circuit 60 is provided with the sub hydraulic pressure unit 631. This sub hydraulic pressure unit 631 substitutes for all (or a part) of the functions of the hydraulic pressure unit 62 to ensure and maintain operation of the hydraulic cylinder 61, when the functions of the hydraulic pressure unit 62 are inhibited by disaster or an unexpected situation.

The sub hydraulic pressure unit 631 has the same structure as an emergency hydraulic system 43 disclosed with a reference symbol of 43 in PTL1, and details of the same are therefore omitted. The sub hydraulic pressure unit 631 includes a hydraulic pump which is driven by an internal combustion engine, a direction control valve for controlling the direction of ejected pressure oil from the hydraulic pump, a pressure control valve for controlling the pressure, and an auxiliary control valve such as the load check valve.

The sub hydraulic pressure unit 631 further includes a flexible feed/discharge conduit 63a, a flexible feed/discharge conduit 63b, and a flexible tank conduit 63c. The flexible feed/discharge conduit 63a has a female joint 90a at its leading end, and is connected to the operating oil ejection side via the female joint 90a. The flexible feed/discharge conduit 63b has a female joint 90b at its leading end, and is connected to the operating oil ejection side via the female joint 90b. The flexible tank conduit 63c is connected to the suction side of the hydraulic pump which is driven by the internal combustion engine, by having its leading end inserted into the tank 64g from the oil supply port 64e of the tank 64g.

In cases of an unexpected situation (e.g., power outage due to earthquake) leading to loss of the functions of the hydraulic pressure unit 62 for example, the sub hydraulic pressure unit 631 having the above-described structure is connected to the hydraulic cylinder 61, by connecting its female joints 90a and 90b fixed at the leading ends of the flexible feed/discharge conduits 63a and 63b, to the male joints 80a and 80b of the joint devices 70a and 70b, respectively. Further, the sub hydraulic pressure unit 631 is connected to the hydraulic cylinder 61 also by having its flexible tank conduit 63c inserted into and connected to the tank 64g.

The joint devices 70 (70a and 70b) are provided to the feed/discharge circuit 69a and 69b, respectively, close to the hydraulic pressure unit 62. As shown in FIG. 5A and FIG. 5B, the joint devices 70 (70a, 70b) each includes: a joint device main body 72 (72a, 72b) provided with a stop valve 71 (71a, 71b) which opens/closes the feed/discharge circuit 69a and 69b; a male joint 80 (80a, 80b) provided downstream side of the stop valve 71 (71a, 71b) in a position that communicates to a port 74 (74a, 74b); and a female joint 90a, 90b.

The joint device 70 shown in FIG. 5A has the joint device main body 72 including: an upstream port 73 connecting to an upstream duct 691a of the feed/discharge duct 69a (upstream duct 691b of the feed/discharge duct 69b); a downstream port 74 connecting to the downstream duct 692a of the feed/discharge duct 69a (downstream duct 692b of the feed/discharge duct 69b); a valve 76 which connects and disconnects the downstream port 74 with the upstream port 73 through operation of a handle 85; and a male joint 80 connecting to the downstream port 74.

FIG. 5B shows the male joint 80 having the male joint main body 81. The male joint main body 81 has a screw part 82 at its lower end, which joints to the joint device main body 72, and another screw part 83 at its upper portion, which joints to the female joint 90. At the center is provided a ball valve 84 which opens and closes a path 85 communicating to the downstream port 74.

The female joint 90 is attached to the leading end of the flexible feed/discharge conduit 63a (flexible feed/discharge conduit 63b), and is configured to joint with the male joint 80 by having the male joint 80 screwed with its screw part 83. The female joint 90 has an attachment member 93 having a screw part 91 jointing the screw part 83, and a cylindrical member 92 rotatably held by the attachment member 93, which is connected to the flexible feed/discharge conduit 63a (flexible feed/discharge conduit 63b).

The male joint 80 and the female joint 90 are jointed as follow. Namely, the screw part 83 of the male joint 80 is screwed into the screw part 91 of the female joint 90, and the lower end of the cylindrical member 92 is inserted into the leading passage of the path 86. In this state, the male joint 80 is further screwed into the female joint 90, and the jointing is completed when the leading end of the cylindrical member 92 reaches a potion such that the ball valve 84 opens against the force exerted by the spring.

It should be noted that a protection cap 89 shown in FIG. 5A is mounted on the leading end portion of the male joint 80 to protect the leading end portion of the male joint 80. The cap is made of a flexible material such as a synthetic resin so as to facilitate attachment/detachment of the cap to/from the leading end portion of the male joint 80. Further, although illustration is omitted, the screw part 91 of the female joint 90 may be provided a protection cap similar to the protection cap 89.

In case of power outage due to earthquake, the hydraulic pump 64f of the hydraulic pressure unit 62 stops, the electromagnetic direction switching valve 65 returns to the neutral position 65a, and all the functions of the hydraulic pressure unit 62 stop. At this time, the feed/discharge duct 69b connected to the rod-side pressure chamber 61c of the hydraulic cylinder 61 is closed by the load check valve 68b, holding the load 61a of the hydraulic cylinder 61 in the position.

In cases of unexpected situation, the handles 85 (85a, 85b) of the joint device 70a and 70b are first operated to block the feed/discharge ducts 69a and 69b at the downstream side of the hydraulic pressure unit 62 by the stop valves 71 (71a, 71b), thereby reliably stop the operation of the hydraulic cylinder 61.

Then, the sub hydraulic pressure unit 631 is connected to the tank 64g by having the leading end of the flexible tank conduit 63c of the sub hydraulic pressure unit 631 inserted into the tank 64g through the oil supply port 64e. Next, the female joints 90a and 90b provided to the leading ends of the flexible feed/discharge conduits 63a and 63b are connected to the male joints 80a and 80b, respectively, and the engine of the sub hydraulic pressure unit 631 is activated to feed/discharge the ejected pressure oil from the hydraulic pump 64f to/from the hydraulic cylinder 61, thereby activating the cylinder during the unexpected situation.

CITATION LIST

Patent Literatures

[PTL1] Japanese Unexamined Patent Publication No. 2014-173721

[PTL2] Japanese Unexamined Patent Publication No. 2011-231924

SUMMARY OF INVENTION

Technical Problem

The hydraulic circuit 60 shown in FIG. 4 elevates the load 61a by the hydraulic cylinder 61, using the pressurized operating oil from the properly operating hydraulic pressure unit 62. When the function of the hydraulic pressure unit 62 stops due to an unexpected situation, the hydraulic circuit 60 is closed to maintain the position of the cylinder 61 so as to prevent an abnormal operation of the load 61a such as moving on its own due to its own weight. That is, when the hydraulic pressure unit 62 stops functioning, the power supply to the electromagnetic direction switching valve 65 is also discontinued. Therefore, although the electromagnetic direction switching valve 65 returns to its neutral position 65a by the spring, the rod-side pressure chamber 61c of the hydraulic cylinder 61 and the tank 64g are disconnected by the load check valve 68b. Thus, the rod of the hydraulic cylinder 61 stops at its position.

When the load check valve 68b is closed, the circuit on the downstream side of the valve is subjected to a pressure within the rod-side pressure chamber 61c and a pressure within the cap-side pressure chamber 61d. Therefore, the hydraulic pressure of the high-pressure high-flow-rate operating oil in the rod-side pressure chamber 61c which is the pressure chamber on the side of the load 61a is applied from the rod-side pressure chamber 61c to the feed/discharge circuit 66b and the feed/discharge duct 69b on the downstream side of the load check valve 68b. Further, the hydraulic pressure of the cap-side pressure chamber 61d is an exhaust pressure and is an extremely low pressure.

As described, when the hydraulic pressure unit 62 stops functioning, the valve 76b of the joint device 70b provided on the downstream side of the load check valve 68b is closed by the handle 85b, thereby closing the feed/discharge duct 69b. Similarly, the valve 76a of the joint device 70a is closed by the handle 85a to close the feed/discharge duct 69a, so that the feed/discharge ducts 69a and 69b are closed. This reliably locks the hydraulic cylinder 61 no matter what situation occurs (breakdown of the machine or damage of the piping, after the occurrence of the unexpected situation) to the hydraulic pressure unit 62.

Next, the flexible tank conduit 63c of the sub hydraulic pressure unit 631 is inserted into the tank 64g, the flexible feed/discharge conduit 63a is connected to the joint device 70a, and the flexible feed/discharge conduit 63b is connected to the joint device 70b. This way, the sub hydraulic pressure unit 631 and the hydraulic cylinder 61 are connected.

The flexible feed/discharge conduit 63b of the sub hydraulic pressure unit 631 and the joint device 70b are connected as follows. Namely, the screw part 91b of the female joint 90b is screwed to the screw part 83b of the male joint 80b. The leading end of the cylindrical member 92b is inserted into the leading end portion of the path 86b and the cylindrical member 92b is rotated so as to open the ball valve 84b by the leading end of the cylindrical member 92b. Similarly, the flexible feed/discharge conduit 63a of the sub hydraulic pressure unit 631 and the joint device 70a are connected as follows. Namely, the screw part 91a of the female joint 90a is screwed to the screw part 83a of the male joint 80a. The leading end of the cylindrical member 92a is inserted into the leading end portion of the path 86a and the cylindrical member 92a is rotated so as to open the ball valve 84a by the leading end of the cylindrical member 92a.

At this time of attachment, the ball valve 84b is seated in the path 86b of the joint device 70b, by the high-pressure high-flow-rate operating oil acting the rod-side pressure chamber 61c. Therefore, the reaction force of the hydraulic pressure is large. Further, even if the ball valve 84b is slightly unseated, the pressure on the side of the path 86 (downstream port 74) does not fall.

The male joint 80b and the female joint 90b need to be connected fast, for the purpose of bringing the hydraulic cylinder 61 under the control as soon as possible, in cases of an unexpected situation. However, the above structure requires a tool for rotating the female joint 90b for connecting operation, due to the high-pressure high-flow-rate operating oil acting to the hydraulic cylinder 61. This necessitates a cumbersome operation, and is not suitable for a connection device that allows simple and speedy connection.

It is therefore an object of the present invention to provide a connection device which is installed in piping, machinery, and the like subjected to high-pressure high-flow-rate operating oil, and provides reliable connection through a simple and speedy operation.

Solution to Problem

A first aspect of the present invention is a joint device 20, comprising: a hydraulic circuit subjected to a pressure fluid and an emergency hydraulic circuit subjected to an emergency pressure fluid from a sub hydraulic pressure unit 131; an upstream port 23 which connects to an upstream side of the hydraulic circuit; a downstream port 24 which connects to a downstream side of the hydraulic circuit; a closed chamber connected to the upstream port 23 via a first stop valve 211 and connected to the downstream port 24 via a second stop valve 212; a first joint 30 having a first passage 35 communicating to the closed chamber 27; and a second joint 40 attachable to the first joint 30, which has a second passage 45 connected to the sub hydraulic pressure unit 631.

The joint device having the above structure includes: the upstream port which connects to the upstream side of the hydraulic circuit; the downstream port which connects to the downstream side of the hydraulic circuit; and the closed chamber 27 connected to the upstream port 23 via the first stop valve 211 and connected to the downstream port 24 via the second stop valve 212. To the closed chamber is connected the first joint attachable to the second joint. By separating the closed chamber 27 from the upstream side, as well as the downstream side, of the hydraulic circuit by the first stop valve 211 and the second stop valve 212, the high-pressure high-flow-rate operating oil acting in the hydraulic circuit does not act on the male joint. Therefore, influences from the high-pressure high-flow-rate operating oil is avoided when connecting the first joint and the second joint. This facilitates connection of the first joint and the second joint.

A second aspect of the present invention is the joint device 20, in which the first joint 30 is a male joint while the second joint 40 is a female joint. The joint device 20 is adapted so that the first joint 30 has a male joint main body 31 having a male joint path as the first passage 35 and a male joint valve seat 37 between one end of the male joint path 35 on the side of the closed chamber 27 and another end of the male joint path 35 to be connected to the female joint 40, and a male joint main valve 34 having an abut portion 343 abuttable to the male joint valve seat 37, the male joint main valve 34 being disposed movably along the male joint path 35, in the male joint path 35. The second joint 40 has a female joint main body 41 having a female joint path as the second passage 45 and a female joint valve seat 47 between one end of the female joint path 45 on the side of the sub hydraulic pressure unit 631 and a female joint leading end portion 43 which is another end of the female joint path 45 and is attachable to the male joint 40, and a female joint main valve 44 having an abut portion 443 abuttable to the male joint valve seat 47, the female joint main valve 44 being disposed movably along the female joint path 45, in the female joint path 45. A distance between the abut portion 343 of the male joint main valve 34 and the abut portion 443 of the female joint main valve 44 is made greater than a distance between the male joint valve seat 37 of the male joint main body 31 and the female joint valve seat 47 of the female joint main body 41, while the leading end portion of the male joint main valve 34 and the leading end portion of the female joint main valve 44 are abutted to each other.

In the above structure, the abut portion 343 of the male joint main valve 34 is separated from the male joint valve seat 37 of the male joint main body 31 and the abut portion 443 of the female joint main valve 44 is separated from the female joint valve seat 47 of the female joint main body 41, by connecting the first joint and the second joint. This way, the first passage 35 of the first joint and the second passage 45 of the second joint are brought into communication with each other. Further, in cases of adopting a structure such that the male joint main valve 34 opens when the female joint 40 is connected to the male joint 30, slightly opening the male joint main valve 34 causes quick drop of the pressure of the closed chamber, which facilitates connection.

A third aspect of the present invention is the joint device, adapted so that the male joint main valve 34 has an in-valve passage 381 penetrating the male joint main valve 34; the in-valve passage 381 being provided therein with an in-valve seat 384, and a decompression valve 38 having an abut portion abuttable to the in-valve seat 384, the decompression valve 38 being disposed movably in the in-valve passage 381 along the in-valve passage 381; and the decompression valve 38 being disposed so as to protrude from the leading end portion of the male joint main valve 34.

Since the joint device 20 of the second aspect of the present invention is provided with the decompression valve 38 in the male joint 30, the decompression valve 38 removes the hydraulic pressure of the closed chamber 27, when the male joint 30 is connected to the female joint 40. The male joint 30 and the female joint 40 are connected thereafter. At this point the closed chamber 27 is separated from the hydraulic circuit by the stop valve, the pressure at the time of connection drops instantly, significantly weakening the reaction force.

Further, the joint device related to the present invention closes the hydraulic circuit and the closed chamber with two stop valves, when the male joint and the female joint are connected, the stop valve on the low pressure side of the hydraulic circuit is opened to increase the volume of the closed chamber, thus enlarging the pressure receiving area of the closed chamber. This reduces the reaction force exerted at the time of connecting, thus facilitating the operation for connecting.

DESCRIPTION OF EMBODIMENTS

Figure 1:
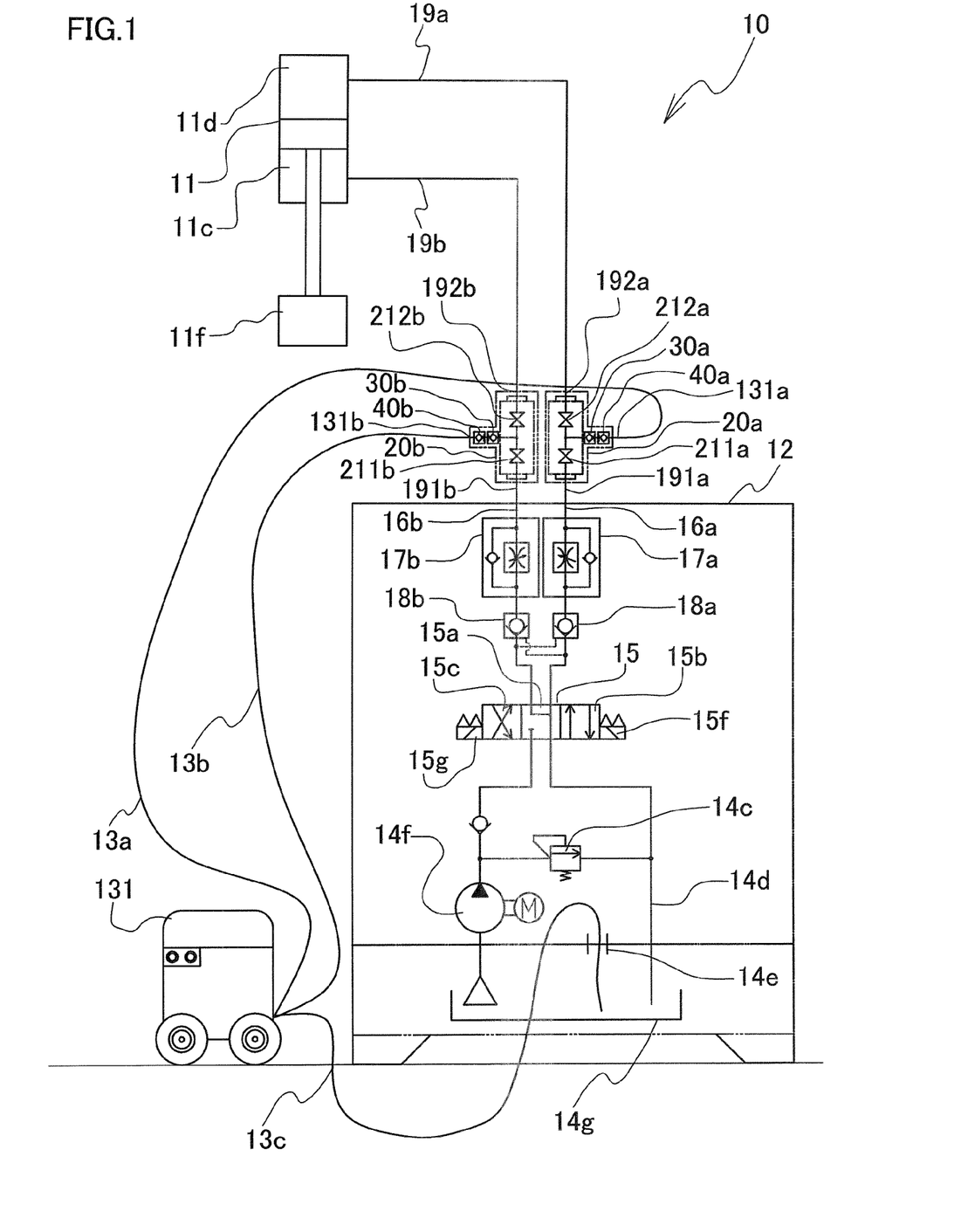
FIG. 1 is a hydraulic circuit diagram showing the joint device related to the present invention.
Figure 2:
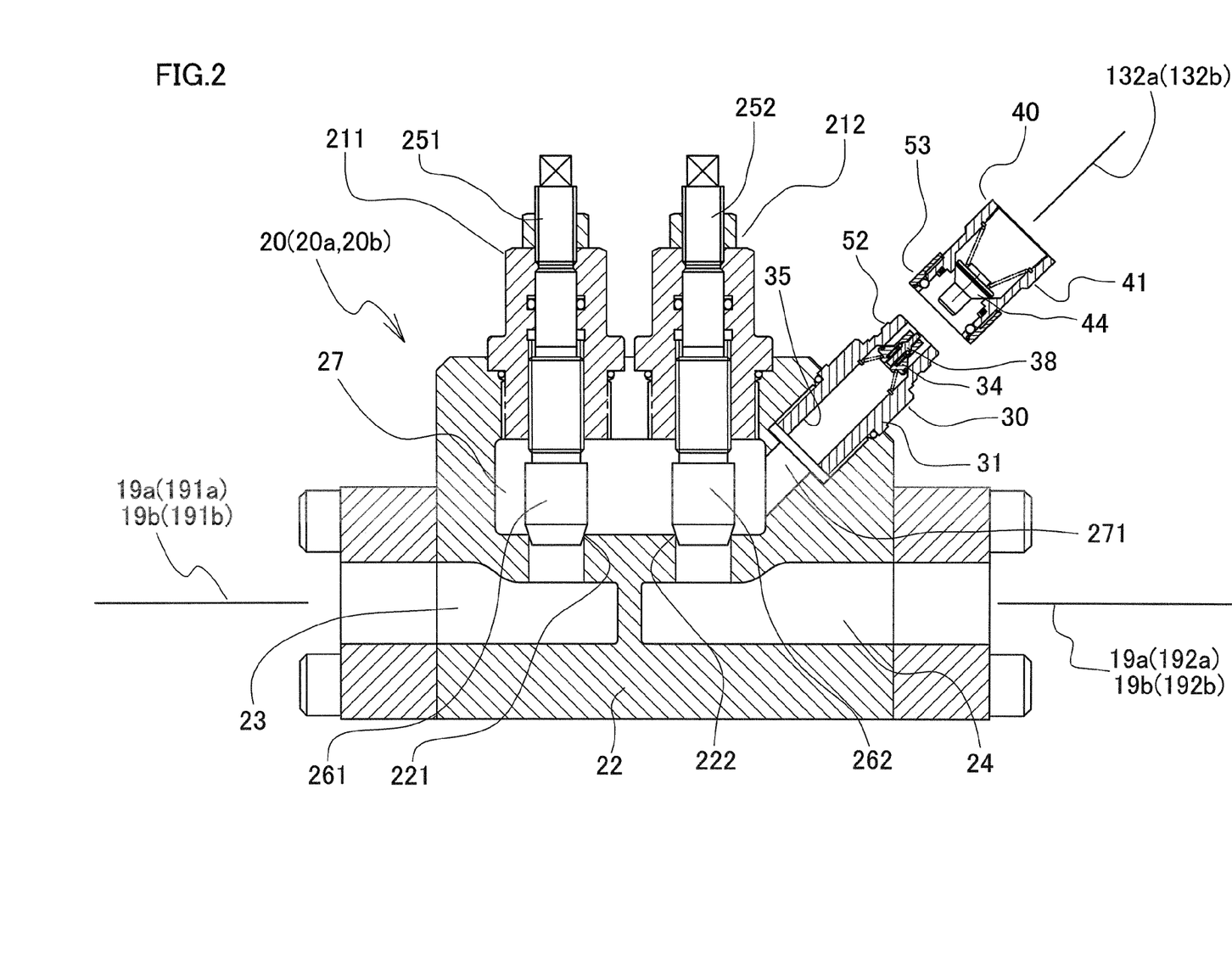
FIG. 2 is a cross sectional view of the joint device related to the present invention.
Figure 3A:
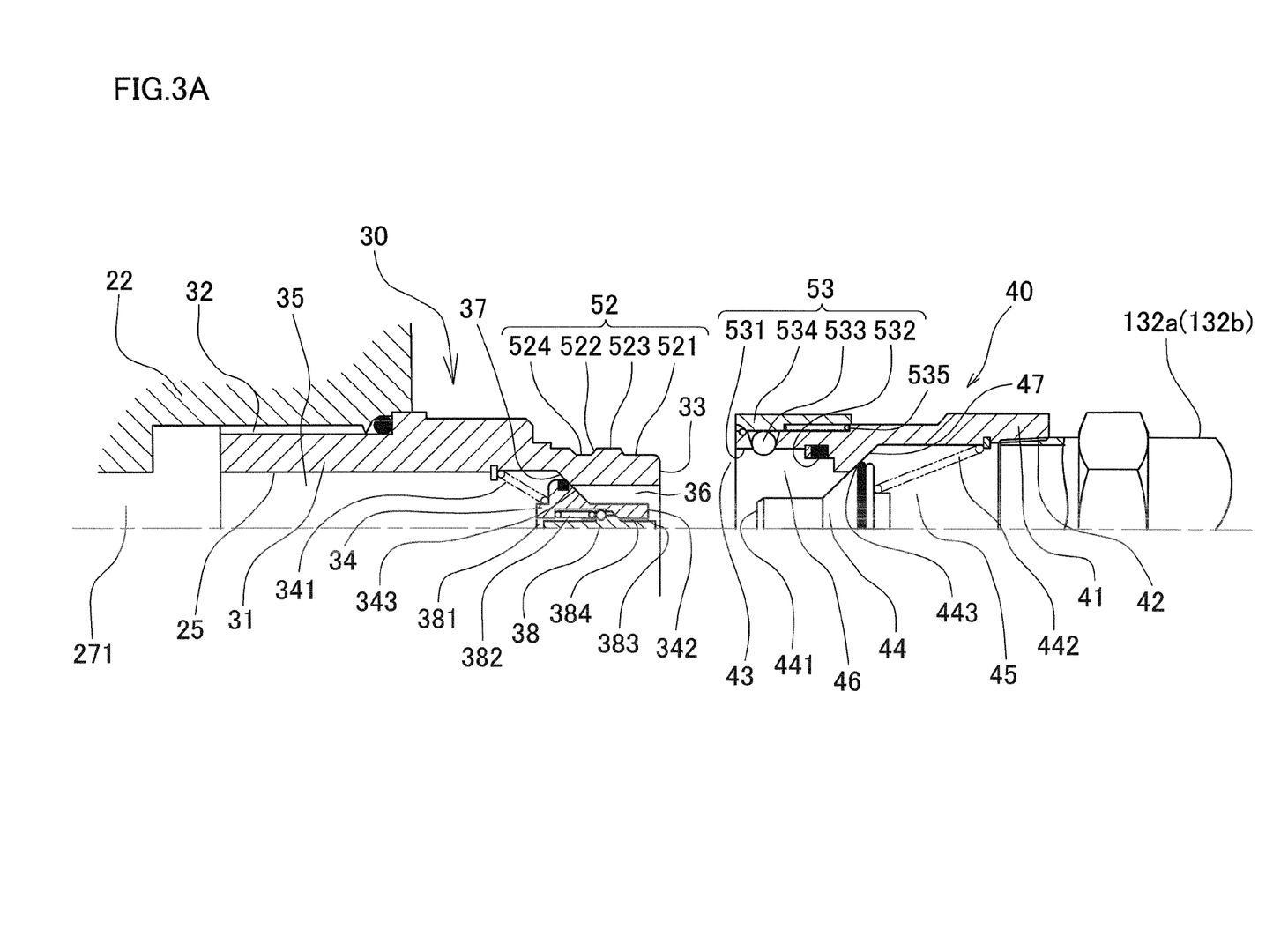
FIG. 3A is a cross sectional view showing a male joint and a female joint of the joint device related to the present invention, separated from each other.
Figure 3B:
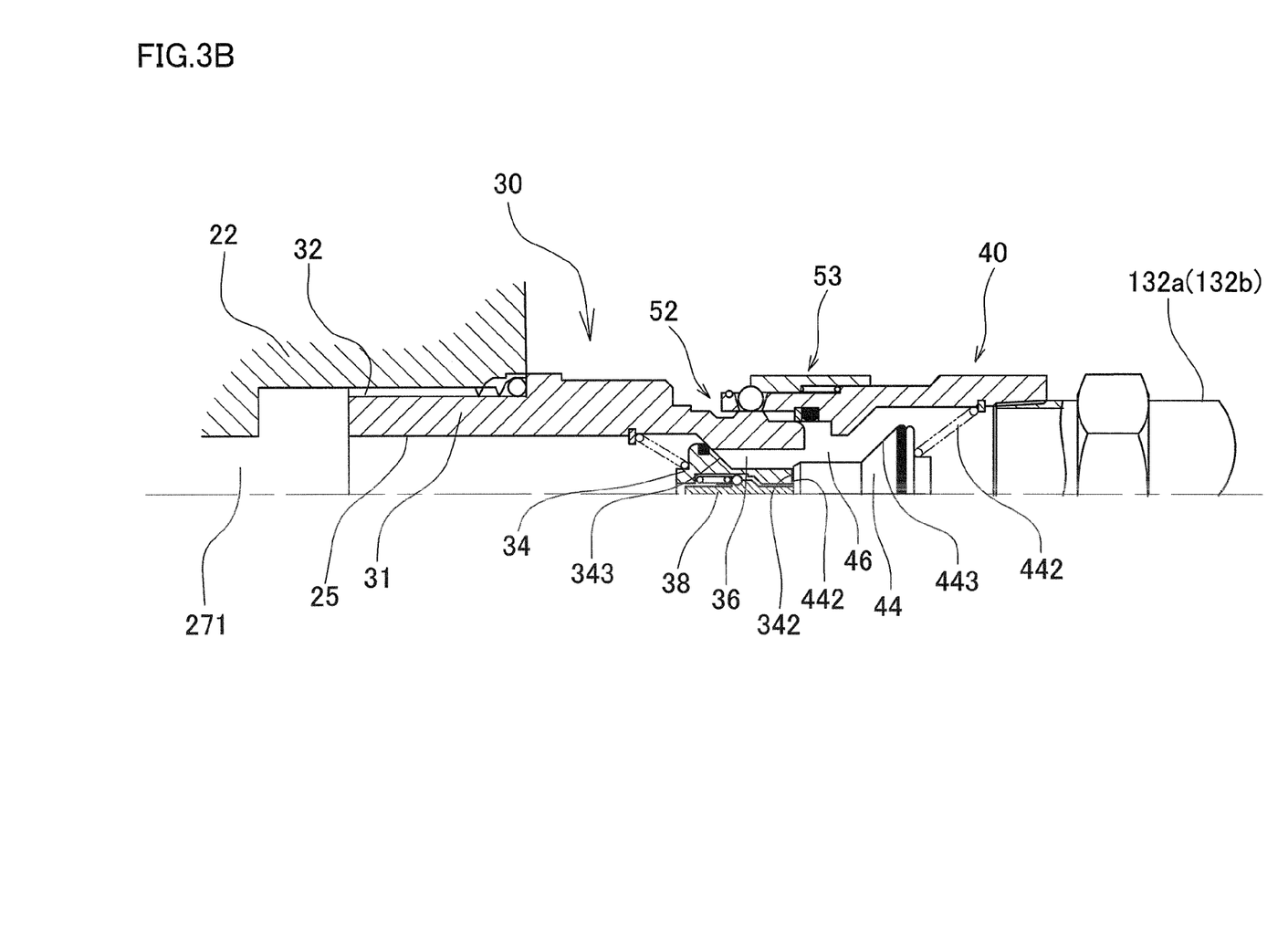
FIG. 3B is a cross sectional view showing the male joint and the female joint of the joint device related to the present invention, in the process of connection.
Figure 3C:
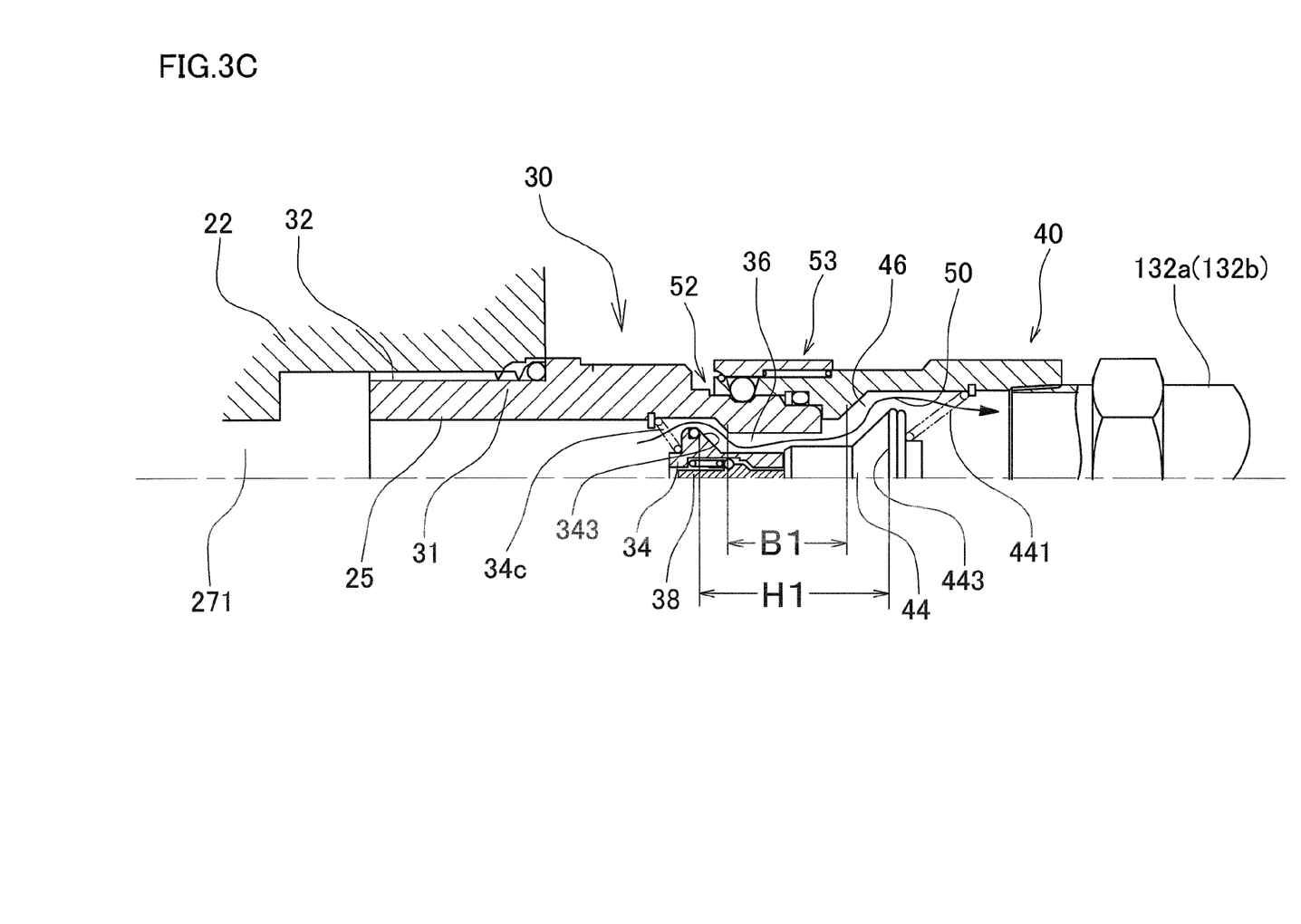
FIG. 3C is a cross sectional view showing the male joint and the female joint of the joint device related to the present invention, connected to each other.

The following describes an embodiment of the present invention, with reference to FIG. 1 showing a hydraulic circuit using a joint device which is the embodiment of the present invention, FIG. 2 showing a cross sectional view of the joint device related to the embodiment of the present invention, and FIG. 3A, FIG. 3B, and FIG. 3C each showing how a male joint and a female joint operate.

As shown in FIG. 1, a hydraulic circuit 10 used in an elevation device for a weir or a water gate includes: a hydraulic cylinder 11 which elevates a load 11f such as a weir or a water gate; and a hydraulic pressure unit 12 having a hydraulic pump 14f and configured to generate pressurized operating oil, and to feed and discharge the pressurized operating oil to/from the hydraulic cylinder 11.

This hydraulic circuit 10 elevates the load 11f by having the hydraulic pressure unit 12 supply or discharge operating oil to/from the hydraulic cylinder 11. This function of the hydraulic pressure unit 12 however is lost in cases of an unexpected situation such as earthquake or power outage due to insufficient power. To tackle such an incidence, the hydraulic circuit 10 is provided with a sub hydraulic pressure unit 131 having a hydraulic pressure generation device having a hydraulic pump whose main driving force is an engine.

Although the sub hydraulic pressure unit 131 has the hydraulic pump as a hydraulic pressure generation source, which is driven by an engine, it is possible to utilize a battery or a dynamo of an automobile as the driving force of the hydraulic pump, mount one or more types of hydraulic pressure sources utilizing manual operations and the like, so as to match the place and condition of the site where the sub hydraulic pressure unit 131 is actually used.

When the hydraulic pressure unit 12 is not able to function as a hydraulic pressure generation source due to power outage, break down of the hydraulic pump, or other components of the hydraulic pressure unit 12 such as a direction switching valve, speed adjustment valve, and the like, the sub hydraulic pressure unit 131 feeds and discharges the pressurized operating oil to/from the hydraulic cylinder 11, in place of the hydraulic pressure unit 12.

While the hydraulic circuit 10 is normal, female joints 40a and 40b on flexible feed/discharge conduits 13a and 13b of the sub hydraulic pressure unit 131 are separated from the male joints 30a and 30b of the joint devices 20a and 20b, and a flexible tank conduit 13c is separated from the tank 14g, thus disconnecting the sub hydraulic pressure unit 131 from the hydraulic circuit 10. This hydraulic cylinder 11 elevates the load 11*f* by having the hydraulic pressure unit 12 supply or discharge the pressurized operating oil generated therein through the electromagnetic direction switching valve 15 of the hydraulic pressure unit 12.

When the hydraulic pump 14*f* is driven by an electric motor and pressurized operating oil is generated, the hydraulic pressure unit 12 controls the pressurized operating oil to a constant value with a pressure control valve 14*c*, and the electromagnetic direction switching valve 15 controls feeding or discharging of the oil to/from the hydraulic cylinder 11 via the feed/discharge circuits 16*a* and 16*b*.

The electromagnetic direction switching valve 15 is a direction switching valve of an electromagnetic operation type, having electromagnetic operation unit 15*f* and 15*g*. The valve is operated from the neutral position 15*a* to the left changeover position 15*c* or the right changeover position 15*b*, with supply of power to the electromagnetic operation unit 15*f* or electromagnetic operation unit 15*g*. When the power supply to the electromagnetic operation units is stopped, the valve automatically returns to the neutral position 15*a*.

As shown in FIG. 1, while the electromagnetic direction switching valve 15 is in the neutral position 15*a*, an ejection side of the hydraulic pump 14*f* is closed, and the pressure oil circulates to the tank 14*g* from the discharge circuit 14*d*, through the pressure control valve 14*c*, and the pressure is maintained to a set value of the pressure control valve 14*c*. Further, although the feed/discharge circuits 16*a* and 16*b* connect to the tank 14*g*, the connection is shut by the load check valves 18*a* and 18*b* provided on the downstream side of the electromagnetic direction switching valve 15.

In other words, while the electromagnetic direction switching valve 15 is in the neutral position 15*a* as shown in the figure, the upstream sides of the load check valves 18*a* and 18*b* provided to the feed/discharge circuit 16*a* and 16*b* are connected to the tank 14*g*. However, the load check valves 18*a* and 18*b* shut the feed/discharge circuits 16*a* and 16*b*. Therefore, the rod-side pressure chamber 11*c* of the hydraulic cylinder 11 is maintained by the load check valves 18*a*, and the load 11*f* maintains its position.

When the electromagnetic direction switching valve 15 is operated to the right changeover position 15*b*, the ejected pressure oil from the hydraulic pump 14*f* flows into the rod-side pressure chamber 11*c* of the hydraulic cylinder 11 from the feed/discharge circuit 16*b* of the hydraulic pressure unit 12, via the feed/discharge duct 19*b* connected thereto and a joint device 20*b* provided to the feed/discharge duct 19*b*. Further, the operating oil in the cap-side pressure chamber 11*d* flows out to the tank 14*g* from the feed/discharge circuit 19*a* via the load check valve 18*a* opened by the pressure of the feed/discharge circuit 16*b*, and the electromagnetic direction switching valve 15. Therefore, the load 11*f* is ascended at a speed controlled by the speed control valve 17*a*.

When the electromagnetic direction switching valve 15 is operated to the left changeover position 15*c*, the ejected pressure oil from the hydraulic pump 14*f* flows into the cap-side pressure chamber 11*d* of the hydraulic cylinder 11 from the feed/discharge circuit 16*a* of the hydraulic pressure unit 12, via the feed/discharge duct 19*a* connected thereto and a joint device 20*a* provided to the feed/discharge duct 19*a*. Further, the operating oil in the rod-side pressure chamber 11*c* flows out to the tank 14*g* from the feed/discharge circuit 19*b* via the load check valve 18*b* opened by the pressure of the feed/discharge circuit 16*a*, and the electromagnetic direction switching valve 15. Therefore, the load 11*f* is descended at a speed controlled by the speed control valve 17*b*.

This sub hydraulic pressure unit 131 substitutes for all (or a part) of the functions of the hydraulic circuit 10 to maintain operation of the hydraulic cylinder 11, when the functions of the hydraulic circuit 10 are inhibited by disaster or an unexpected situation.

The emergency hydraulic system 43 disclosed in PTL1 has the identical structure with the sub hydraulic pressure unit 131. Therefore, descriptions as for the sub hydraulic pressure unit 131 are provided only for the parts needs to be described, and the details are omitted. The sub hydraulic pressure unit 131 includes a hydraulic pump which is driven by an internal combustion engine, a direction control valve for controlling the flow direction of ejected pressure oil from the hydraulic pump, a pressure control valve, and an auxiliary control valve such as the load check valve, and is structured to have a function of controlling the pressurized operating oil of the hydraulic cylinder 11.

The sub hydraulic pressure unit 131 further includes a flexible feed/discharge conduit 13*a*, a flexible feed/discharge conduit 13*b*, and a flexible tank conduit 13*c*. The flexible feed/discharge conduit 13*a* has a female joint 40*a* at its leading end, and is connected to the side of feeding/discharging the operating oil. The flexible feed/discharge conduit 13*b* has a female joint 40*b* at its leading end, and is connected to the side of feeding/discharging the operating oil. The flexible tank conduit 13*c* is connected to the suction side of the hydraulic pump which is driven by the internal combustion engine, by having its leading end inserted into the tank 14*g* from the oil supply port 14*e* of the tank 14*g*.

In cases of an unexpected situation (e.g., power outage due to earthquake) leading to loss of the functions of the hydraulic pressure unit 12 for example, the female joints 40*a* and 40*b* fixed at the leading ends of the flexible feed/discharge conduits 13*a* and 13*b* of the sub hydraulic pressure unit 131 are connected to the male joints 30*a* and 30*b* of the joint devices 20*a* and 20*b*, respectively. Inserting the flexible tank conduit 13*c* into the tank 14*g* from the oil supply port 14*e* completes the connection to the hydraulic cylinder 11. Then, the ejected pressure oil from the sub hydraulic pressure unit 131 is fed or discharged to/from the hydraulic cylinder 11 via the feed/discharge circuits 19*a* and 19*b*.

As shown in FIG. 2, each of the joint devices 20*a* and 20*b* provided to the feed/discharge circuits 19*a* and 19*b*, closely to the hydraulic pressure unit 12 includes: an upstream side stop valve 211 and a downstream side stop valve 212 having valves 261 and 262 disposed to abut valve seats 221 and 222, respectively; a joint valve body 22 having a closed chamber 27 which is separated from the upstream port 23 and the downstream port 24, by the upstream side stop valve 211 and the downstream side stop valve 212; a male joint 30 provided to the joint valve body 22 and in communication with the closed chamber 27; and a female joint 40 attached or detached to or from the male joint 30.

It should be noted that the structures of the joint devices 20*a* and 20*b* are identical to each other, and the operations thereof differ depending on where they are used. Therefore, alphabets "a" and "b" are given to reference symbols when these devices need to be distinguished from one another in the description of the circuit. The upstream port 23 connects to the upstream ducts 191*a* and 191*b* of the feed/discharge ducts 19*a* and 19*b*, whereas the downstream port 24 connects to the downstream ducts 192*a* and 192*b* of the feed/discharge ducts 19*a* and 19*b*.

The upstream side stop valve 211 (corresponding to "first stop valve" of the present invention) and the downstream side stop valve 212 (corresponding to "second stop valve" of the present invention) provided side-by-side to the joint valve body 22 include, respectively: valves 261 and 262 operated by operation of valve stems 251 and 252; and valve seats 221 and 222 to which the valves 261 and 262 abut, which open and close the passages between the closed chamber 27, and the upstream port 23 and the downstream port 24. The valve stems 251 and 252 are operated by not-shown handles separately mounted.

As shown in FIG. 3A to FIG. 3C, each male joint 30 has a male joint main body 31 provided with a screw part 32 and a male joint unit 52. The screw part 32 has a male joint path 35 whose one end is connected (jointed) to a closed chamber path 271 of the closed chamber 27 of the joint valve body 22. Another end 33 of the male joint unit 52 fits into a female joint unit 53 of the female joint 40, and the female joint 40 is attached to the leading end portion 132a or 132b of the flexible feed/discharge conduit 13a or 13b of the sub hydraulic pressure unit 131. The male joint main body 31 is provided with the male joint path 35 communicating to the closed chamber 27 and a leading passage 36 of the leading end portion 33.

Further, the male joint 30 has a male joint main valve 34, and the male joint main valve 34 is provided so as to be movable along the male joint path 35 between the male joint path 35 which opens to the closed chamber 27 and the leading passage 36 of the leading end portion 33. The male joint main valve 34 is pressed towards the leading end portion 33 of the male joint unit 52 by a spring 341 held in the male joint path 35, and shuts the male joint path 35 and the leading passage 36 from each other, in cooperation with (by abutting) the male joint valve seat 37 provided between the leading passage 36 and the male joint path 35.

The male joint main valve 34 is provided therein with a decompression valve 38. The decompression valve 38 is inserted, with some space, in the in-valve passage 381 penetrating the male joint main valve 34, and is pressed by an in-valve spring 382, and abutted to the in-valve seat 384 formed in the in-valve passage 381, thus closing the in-valve passage 381. The leading end portion 383 of the decompression valve 38 protrudes from the leading end portion 342 of the male joint main valve 34. When the male joint 30 and the female joint 40 are connected, the leading end portion 441 of the female joint main valve 44 presses the leading end portion 383, before pressing the leading end portion 342 of the female joint main valve 34. With this pressing, the decompression valve 38 is unseated from the in-valve seat 384, thus opening the in-valve passage 381. The pressure oil in the male joint path 35 is discharged from the in-valve passage 381 to the leading passage 46 of the female joint 40, through the leading passage 36. After that, the leading end portion 441 of the female joint main valve 44 presses the leading end portion 342 of the female joint main valve 34. This causes the male joint main valve 34 to depart from the in-valve pass ge valve seat 37, communicating the male joint path 35 with the leading passage 36, and the pressure oil in the male joint path 35 is discharged to the leading passage 36.

As described above, the male joint main valve 34 is seated to the male joint valve seat 37 to shut the male joint path 35 and the leading passage 36 from each other. Therefore, the valve is pressed by the hydraulic pressure in the male joint path 35. However, when the female joint 40 is jointed to the leading end portion 33, the decompression valve 38 of the male joint 30 is pressed as shown in FIG. 3B, thereby discharging the pressure oil in the male joint path 35 from the in-valve passage 381 to the leading passage 46 of the female joint 40 through the leading passage 36. Then, the male joint leading end portion 33 and the female joint 40 are jointed to each other while maintaining a low pressure state as shown in FIG. 3C. Therefore, the joint will be a light joint state with hardly any resistance by the hydraulic pressure.

The male joint unit 52 provided to the leading end portion 33 of the male joint 30 is provided with an engagement end 521, a trapezoidal protrusion 523, and a trapezoidal groove 522. The engagement end 521 is fitted, with some space, into a sealed inner hole 532 having therein an O-ring, which is provided to the female joint unit 53 of the female joint 40. The trapezoidal protrusion 523 continuous from the engagement end 521 is fitted into an engagement end 531 of the female joint unit 53. The trapezoidal groove 522 continuous from the trapezoidal protrusion 523 has a bottom portion 524 whose diameter is substantially the same as that of the engagement end 521.

The female joint 40 has a female joint main body 41 having a screw part 42, and a female joint path 45 (hereinafter, path 45). One end of the screw part 42 is screwed to leading end portion 132a or 132b of the flexible feed/discharge conduit 13a or 13b. This way, the path 45 communicates with the leading end portion 132.a or 132b on the side of the screw part 42. The female joint main body 41 has a leading passage 46 which communicates to the leading passage 36 of the male joint 30, and which is configured to communicate with the path 45. The leading passage 46 is provided, on the side of the female joint unit leading end portion 43, with a female joint unit 53 which fits into the male joint leading end portion 33 of the male joint 30.

Further, the female joint 40 has a female joint main valve 44. This female joint main valve 44 is provided at an interface position between the path 45 communicating to the leading end portion 132a or 132b of the flexible feed/discharge conduit 13a or 13b and the leading passage 46 of the female joint leading end portion 43. The female joint main valve 44 is pressed towards the leading passage 46 by a spring 442 held within the path 45, and closes the leading passage 46 of the path 45 in cooperation with (by abutting to) the female joint valve seat 47 provided between the path 45 and the leading passage 46.

As shown in FIG. 3A, while the male joint 30 and the female joint 40 are separated from each other, a valve-head part 443 of the female joint main valve 44 (corresponding to the "contact portion" of the present invention) is seated to the female joint valve seat 47, thus shutting the path 45 and the leading passage 46 from each other. Then, as shown in FIG. 3B, at a time of connecting the male joint 30 and the female joint 40, the female joint main valve 44 first abuts the leading end portion 383 of the decompression valve 38, and abuts the leading end portion 343 of the male joint main valve 34, while opening the decompression valve 38. This abutting causes the valve-head part 443 of the female joint main valve 44 to depart from the female joint valve seat 47, thus communicating the path 45 with the leading passage 46. During this state, the valve-head part 343 of the male joint main valve 34 (corresponding to the "contact portion" of the present invention) abuts the male joint valve seat 37. After that, as shown in FIG. 3C, the female joint main valve 44 presses the leading end portion 343 of the male joint main valve 34, thus unseating the valve-head part 343 of the male joint main valve 34 from the male joint valve seat 37 to open the male joint path 35.

The female joint unit 53 provided to the female joint leading end portion 43 of the female joint 40 has an engagement end 531 in which a guide engagement end 521 of the male joint leading end portion 33 is inserted with some space; a sealed inner hole 532 having therein an O-ring, which hole the guide engagement end 521 of the male joint main body 31 is fitted; and a lock ball 533 held in a state of protruding towards inside of the engagement end 531 by a lock sleeve 534.

The lock sleeve 534 is provided, on the outer circumference of the female joint main body 41, in such a manner as to be slidable in an axial direction of the female joint main body 41, and is biased in a direction of the female joint leading end portion 43 by a spring 535 provided between the sleeve and the female joint main body 41, as shown in FIG. 3A. The lock sleeve 534, while being maintained on the side of the female joint leading end portion 43, holds the lock ball 533 so as to keep it from moving in a radial direction. When the lock sleeve 534 is moved to the position of FIG. 3B, against the spring 535, the lock ball 533 is held so as to be movable in a radial direction along the surface of the trapezoidal protrusion 523.

When the lock sleeve 534 is moved against the spring 533, thus making the lock ball 533 movable in a radial direction as shown in FIG. 3B, the lock ball 533 gets over the trapezoidal protrusion 523 of the male joint unit 52, and fits into the trapezoidal groove 522, as shown in FIG. 3C. Returning the lock sleeve 534 from the state by the biasing force of the spring 535 locks the male joint 30 and the female joint 40 in the locked state, as shown in FIG. 3C. It should be noted that, during this state, an action of fitting the guide engagement end 521 into the sealed inner hole 532 takes place at the same time.

As hereinabove mentioned, the male joint 30 and the female joint 40 are jointed as follows. Namely, as shown in FIG. 3B, the lock sleeve 534 of the female joint 40 is retracted against the biasing force of the spring 535, to enable the lock ball 533 to move in a radial direction. Then, as shown in FIG. 3C, the male joint unit 52 is inserted into the female joint unit 53 so that the lock ball 533 reaches the position of the trapezoidal groove 522. By returning the lock sleeve 534 at thereafter causes the lock ball 533 to fit into the trapezoidal groove 522, thus locking the male joint 30 and the female joint 40, completing jointing of them.

When jointing of the male joint 30 and the female joint 40 completes as shown in FIG. 3C, an inter-valve-head distance H1 between the valve-head part 443 abuttable to the female joint valve seat 47 of the female joint main valve 44 and the valve-head part 343 abuttable to the male joint valve seat 37 of the male joint main valve 34 is greater than an inter-valve-head distance B1 between the male joint valve seat 37 and the male joint valve seat 47. Therefore, a connection path 50 is formed, which is indicated by a curved arrow on joint device 20.

The following describes action of a hydraulic circuit 10 having the joint devices 20a and 20b described hereinabove.

When the electromagnetic direction switching valve 15, in the hydraulic circuit 10 shown in FIG. 1, is operated to be in the neutral position 15a, the ejection side of the hydraulic pump 14f is closed, and the ejected pressure oil is discharged from the discharge circuit 14d to the tank 14g, via the pressure control valve 14c. Further, the oil on the upstream side of the load check valves 18a and 18b is discharged from the discharge circuit 14d to the tank 14g. Therefore, the load check valves 18a and 18b closes the feed/discharge circuits 16a and 16b to keep (the position of the rod of) the hydraulic cylinder 11.

When the electromagnetic direction switching valve 15 is operated to the position of the right changeover position 15b, the feed/discharge circuit 16b is connected to the ejection side of the hydraulic pump 14f and the feed/discharge circuit 16a is connected to the tank 14g. The ejected pressure oil of the hydraulic pump 14f is supplied from the feed/discharge circuit 16a to the rod-side pressure chamber 11c of the hydraulic cylinder 11, via the feed/discharge duct 19b, while the operating oil of the cap-side pressure chamber 11d is discharged from the feed/discharge duct 19a to the tank 14g, through the feed/discharge circuit 16a, thus causing the hydraulic cylinder 11 to ascend the load 11f.

On the other hand, when the electromagnetic direction switching valve 15 is operated to the position of the left changeover position 15c, the feed/discharge circuit 16a is connected to the ejection side of the hydraulic pump 14f and the feed/discharge circuit 16b is connected to the tank 14g. The ejected pressure oil of the hydraulic pump 14f is supplied from the feed/discharge circuit 16a to the cap-side pressure chamber 11d of the hydraulic cylinder 11, via the feed/discharge duct 19a, while the operating oil of the rod-side pressure chamber 11c is discharged from the feed/discharge duct 19b to the tank 14g, through the feed/discharge circuit 16b, thus causing the hydraulic cylinder 11 to descend the load 11f.

In the above operations, the speed control valve 17a regulates the flow rate in the feed/discharge circuit 16a to control the ascending speed of the load 11f of the hydraulic cylinder 11, whereas the speed control valve 17b regulates the flow rate in the feed/discharge circuit 16b to control the descending speed of the load 11f of the hydraulic cylinder 11. Further, each of the load check valves 18a and 18b shuts a flow from its downstream side to the upstream side, when the upstream side is connected to the tank 14g.

If an unexpected situation takes place while the electromagnetic direction switching valve 15 of the hydraulic circuit 10 is operated to the right changeover position 15b and while the hydraulic cylinder 11 is ascending, the operation signals to the electromagnetic direction switching valve 15 are stopped due to the unexpected situation. This causes the electromagnetic direction switching valve 15 to automatically return to the neutral position 15a, and the upstream side of the load check valves 18a and 18b is connected to the tank 14g, and the feed/discharge circuits 16a and 16b are shut by the load check valves 18a and 18b. Therefore, (the rod) of the hydraulic cylinder 11 is stopped at the position.

As described, when the load check valves 18a and 18b close the feed/discharge circuit 16a and 16b and stop the hydraulic cylinder 11 due to the unexpected situation, the load check valve 18b will be subjected to the hydraulic pressure from the rod-side pressure chamber 11c of the hydraulic cylinder 11, due to the load 11f. To avoid influences from this state, the upstream side stop valve 211b of the joint device 20b is closed to shut the feed/discharge duct 19b at the downstream side of the hydraulic pressure unit 12, thereby preventing an unexpected action of the hydraulic cylinder 11 due to damages to the circuit within the hydraulic pressure unit 12 or the hydraulic equipment.

The stopping function of the hydraulic cylinder 11 by the joint device 20b is maintained by closing of the upstream side stop valve 211b. It should be noted that the cap-side pressure chamber 11d of the hydraulic cylinder 11 is not subjected to any load, and the pressure therein is an exhaust pressure and is an extremely low pressure. Therefore, the stopping function of the hydraulic cylinder 11 is not influenced even without closing of the upstream side stop valve 211a of the joint device 20a. However, the valve is closed for avoiding an accident due to the hydraulic pressure unit 12.

The emergency hydraulic circuit is formed by connecting the flexible feed/discharge conduit 13a and 13b of the sub hydraulic pressure unit 131 to the feed/discharge ducts 19a and 19b through the joint devices 20a and 20b of the hydraulic circuit 10. More specifically, the emergency hydraulic circuit is formed by changing the connecting destinations of the feed/discharge ducts 19a and 19b from the hydraulic pressure unit 12 to the sub hydraulic pressure unit 131, by the joint devices 20a and 20b. That is, by connecting the female joints 40a and 40b of the sub hydraulic pressure unit 131 to the male joints 30a and 30b, and close the upstream side stop valves 211a and 211b of the joint devices 20a and 20b, the hydraulic pressure unit 12 and the sub hydraulic pressure unit 131 are separated, and the hydraulic cylinder 11 is controlled by the pressurized operating oil of the sub hydraulic pressure unit 131.

Since the pressure of the feed/discharge duct 19a is low, jointing of the female joint 40a and the male joint 30a at the joint device 20a, while connecting the female joint 40a and the male joint 30a, shuts the hydraulic pressure unit 12 and the hydraulic cylinder 11 by closing the upstream side stop valve 211a. This connection is easily done, because the pressure in the cap-side pressure chamber 11d is low and the pressure in the male joint path 35 of the male joint 30a is also low, hence the pressure pressing the male joint main valve 34 is small.

It is hard to joint the female joint 40b of the joint device 20b and the male joint 30b simply by closing the upstream side stop valve 211b of the joint device 20b. This is because the closed chamber 27 is subjected to high pressure high-flow rate pressure oil attributed to the load 11f of the hydraulic cylinder 11 (in the high pressure state similar to the state where the hydraulic circuit is connected to the hydraulic pump).

In the present embodiment, however, a closed chamber 27 communicating with the male joint 30 is formed in the joint device 20b, and this closed chamber 27 is not only connected to the upstream port 23 in such a manner as to be capable of being opened and closed by the upstream side stop valve 211b, but also connected to the downstream port 24 in such a manner as to be opened and closed by the downstream side stop valve 211b. Therefore, female joint 40b and the male joint 30b are easily connected. More specifically, when the upstream side stop valve 211b of the closed chamber 27 of the joint device 20b is closed, followed by closing of the downstream side stop valve 212b (sequence of closing the upstream side stop valve 211 and the downstream side stop valve 212 is not particularly limited, and these valve may be closed at the same time), the closed chamber 27 is sealed which makes it a chamber of a small volume. Therefore, supply of the pressure oil to the closed chamber 27 is stopped, and hydraulic pressure of the closed chamber 27 is sufficiently lowered. This facilitates connection of the male joint 30b and the female joint 40b. Further, since the present embodiment is provided with the decompression valve 38 in the male joint main valve 34 of the male joint 30b, opening the decompression valve 38 to form the in-valve passage 381 as shown in FIG. 3B causes discharging of the pressurized oil in the closed chamber 27 to the flexible feed/discharge conduit 13b, thus lowering the pressure. Therefore, connecting the male joint 30b and the female joint 40b does not require too much power. It should be noted that in the present embodiment, the male joint 30b is provided with the decompression valve 38. However, such a structure does not necessarily have to be adopted and any given structure is adoptable, provided that the male joint 30b and the female joint 40b are connectible.

By jointing the female joint 40b to the male joint 30b of the joint device 20b to open the downstream side stop valve 212 of the joint device 20b, there is formed a circuit in which the ejected pressure oil generated by the sub hydraulic pump of the sub hydraulic pressure unit 131 is supplied from the flexible feed/discharge conduit 13b to the rod-side pressure chamber 11c of the hydraulic cylinder 11, via the joint device 20b and the feed/discharge circuit 19b.

Further, by jointing the female joint 40a to the male joint 30a of the joint device 20a to open the downstream side stop valve 212 of the joint device 20a, there is formed a circuit in which the oil from the cap-side pressure chamber 11d is circulated from the flexible supply/discharge conduit 13a to the suction side of the sub hydraulic pump of the sub hydraulic pressure unit 131, via the feed/discharge circuit 19a and the joint device 20a.

The connection of the flexible feed/discharge conduits 13a and 13b of the sub hydraulic pressure unit 131 to the ejection side and the suction side of the sub hydraulic pump may be switched over by a sub direction switching valve of the sub hydraulic pressure unit 131. If one end is connected to the ejection side of the sub hydraulic pump, the other end is connected to the suction side of the sub hydraulic pump.

The flexible tank conduit 13c to be connected to the suction side of the sub hydraulic pump of the sub hydraulic pressure unit 131 sucks or discharge operating oil from/to the tank 14g of the hydraulic pressure unit 12, to counterbalance the surplus or shortage of the operating oil associated with the direction in which the hydraulic cylinder 11 is activated.

In other words, in the emergency hydraulic circuit formed by connecting the hydraulic cylinder 11 with the sub hydraulic pressure unit 131, one of the flexible feed/discharge conduit 13a and 13b is connected to the ejection side of the sub hydraulic pump while the other one of the flexible feed/discharge conduits 13a and 13b is connected to the suction side of the sub hydraulic pump of the sub hydraulic pressure unit 131, via the sub direction switching valve, in order to activate the hydraulic cylinder 11. With this, the surplus or shortage of the pressure oil to the hydraulic cylinder 11 is counterbalanced by supplying or discharging the pressure oil through the flexible tank conduit 13c.

After the unexpected situation is contained, and the power source is recovered, the flexible feed/discharge conduits 13a and 13b of the sub hydraulic pressure unit 131 are detached from the joint devices 20a and 20b, and the flexible tank conduit 13c is withdrawn from the tank 14g, thus separating the flexible feed/discharge conduits 13a from the hydraulic pressure unit 12. After that, the hydraulic pressure unit 12 is inspected if there is any abnormality, and if no abnormality is confirmed, the upstream side stop valves 211 and the downstream side stop valves 212 of the joint devices 20a and 20b are opened to connect the hydraulic pressure unit 12 with the hydraulic cylinder 11.

When an emergency hydraulic circuit is formed by connecting a hydraulic cylinder 11 with a sub hydraulic pressure unit 131, in place of a hydraulic circuit 10 having encountered an unexpected situation, the present embodiment requires less power to connect the sub hydraulic pressure unit 131 with the hydraulic cylinder 11, even though the hydraulic cylinder 11 is subjected to a load. Hence, it is possible to promptly form the emergency hydraulic circuit.

Further, the present embodiment allows continuous operation of the hydraulic cylinder 11 from the state of encountering the unexpected situation. Therefore, no malfunction will take place to the equipment (dam weir) operated by the hydraulic cylinder 11, before and after the occurrence of the unexpected situation.

It should be noted that the present embodiment deals with joint devices 20a and 20b, each including a closed chamber 27 connected to the upstream port 23 via the upstream side stop valve 211 and connected to the downstream port 24 via the downstream side stop valve 212; a male joint 30 having a male joint path communicating to the closed chamber 27; a female joint 40 attachable to the male joint 30. However, the present invention is not limited to such a structure. As described with reference to FIG. 5A, the male joint 30 and the female joint 40 of the present embodiment may be adopted to a joint device having a single stop valve for opening and closing the connection between the upstream port 73 and the male joint 30.

REFERENCE SIGNS LIST

10: Hydraulic Circuit
11: Hydraulic Cylinder
12: Hydraulic Pressure Unit
13: Sub Hydraulic Pressure Unit
13a, 13b: Flexible Feed/Discharge Conduit
13c: Flexible Tank Conduit
132a, 132b: Leading End Portion
14c: Pressure Control Valve
14d: Discharge Circuit
14e: Oil Supply Port
14f: Hydraulic Pump
14g: Tank
15: Electromagnetic Direction Switching Valve
15a: Neutral Position
15b: Right Changeover Position
15c: Left Changeover Position
16a, 16b: Feed/Discharge Circuit
17a, 17b: Speed Control Valve
18a, 18b: Load Check Valve
19a, 19b: Feed/Discharge Duct
20, 20a, 20b: Joint Device
22: Joint Valve Body
23: Upstream Port
24: Downstream Port
27: Closed Chamber
271: Closed Chamber Path
30a, 30b: Male Joint
31: Male Joint Main Body
32: Screw Part
33: Male Joint Leading End Portion
34: Male Joint Main Valve
35: Male Joint Path
36: Leading Passage
37: Male Joint Valve Seat
38: Decompression Valve
40: Female Joint
41: Female Joint Main Body
42: Female/Male Joint Screw Part
43: Female Joint Leading End Portion
44: Female Joint Main Valve
45: Female Joint Path
46: Leading Passage
47: Female Joint Valve Seat
50: Connection Path
52: Male Joint Unit
53: Female Joint Unit
211: Upstream Side Stop Valve
212: Downstream Side Stop Valve
221, 222: Valve Seat
251, 252: Valve Stem
261, 262: valve
521: Guide Engagement End
522: Trapezoidal Groove
523: Trapezoidal Protrusion
524: Bottom Portion
531: Engagement End
532: Sealed Inner Hole
533: Lock Ball
534: Lock Sleeve
535: Spring

The invention claimed is:

1. A joint device, comprising:
an upstream port which connects to an upstream side of a hydraulic circuit;
a downstream port which connects to a downstream side of the hydraulic circuit;
a closed chamber connected to the upstream port via a first stop valve and connected to the downstream port via a second stop valve;
a first joint having a first passage communicating to the closed chamber; and
a second joint attachable to the first joint, which has a second passage connected to an emergency hydraulic circuit,
wherein the hydraulic circuit is subjected to a pressure fluid from a hydraulic pressure unit,
wherein the emergency hydraulic circuit subjected to an emergency pressure fluid from a sub hydraulic pressure unit,
wherein upstream and downstream refer to opposite directions of flow relative to the closed chamber, and
wherein the first stop valve and the second stop valve are capable of operating independently.

2. The joint device, according to claim 1, wherein the first joint is a male joint while the second joint is a female joint, the male joint comprising:
a male joint main body having a male joint path as the first passage and a male joint valve seat between one end of the male joint path on the side of the closed chamber and another end of the male joint path to be connected to the female joint, and
a male joint main valve having an abut portion abuttable to the male joint valve seat, the male joint main valve being disposed movably along the male joint path in the male joint path; and
the female joint comprising:
a female joint main body having a female joint path as the second passage and a female joint valve seat between one end of the female joint path on the side of the sub hydraulic pressure unit and a female joint leading end portion which is another end of the female joint path and is attachable to the male joint, and
a female joint main valve having an abut portion abuttable to the female joint valve seat, the female joint main valve being disposed movably along the female joint path in the female joint path,
wherein a distance between the abut portion of the male joint main valve and the abut portion of the female joint main valve is made greater than a distance between the male joint valve seat of the male joint main body and the female joint valve seat of the female joint main body, while a leading end portion of the male joint main valve and a leading end portion of the female joint main valve are abutted to each other.

3. The joint device, according to claim 2, wherein the male joint main valve comprises:
- an in-valve passage penetrating the male joint main valve, the in-valve passage being provided therein with an in-valve seat, and
- a decompression valve having an abut portion abuttable to the in-valve seat, the decompression valve being disposed movably in the in-valve passage along the in-valve passage, and the decompression valve being disposed so as to protrude from the leading end portion of the male joint main valve.

* * * * *